US011904636B2

(12) United States Patent
Shimizu

(10) Patent No.: US 11,904,636 B2
(45) Date of Patent: Feb. 20, 2024

(54) PNEUMATIC TIRE

(71) Applicant: BRIDGESTONE CORPORATION, Tokyo (JP)

(72) Inventor: Akiyoshi Shimizu, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 229 days.

(21) Appl. No.: 17/753,600

(22) PCT Filed: Jun. 22, 2020

(86) PCT No.: PCT/JP2020/024397
§ 371 (c)(1),
(2) Date: Mar. 9, 2022

(87) PCT Pub. No.: WO2021/053912
PCT Pub. Date: Mar. 25, 2021

(65) Prior Publication Data
US 2022/0324264 A1 Oct. 13, 2022

(30) Foreign Application Priority Data
Sep. 19, 2019 (JP) ................................ 2019-170668

(51) Int. Cl.
*B60C 11/12* (2006.01)
(52) U.S. Cl.
CPC ...... *B60C 11/1218* (2013.01); *B60C 11/1281* (2013.01)
(58) Field of Classification Search
CPC .. B60C 11/1281; B60C 11/1218; B60C 11/12
See application file for complete search history.

(56) References Cited

U.S. PATENT DOCUMENTS 6,681,824 B2 1/2004 Lopez
8,162,642 B2 4/2012 Van Nguyen et al.
(Continued)

FOREIGN PATENT DOCUMENTS

CN 1958314 A 5/2007
EP 3130482 A1 2/2017
(Continued)

OTHER PUBLICATIONS

Sep. 1, 2020, International Search Report issued in the International Patent Application No. PCT/JP2020/024397.
(Continued)

*Primary Examiner* — Robert C Dye
*Assistant Examiner* — Nicholas J Weiler
(74) *Attorney, Agent, or Firm* — KENJA IP LAW PC

(57) ABSTRACT

A pneumatic tire includes, in a land portion, at least one circumferential sipe extending in the tire circumferential direction. At a first position, from the tread surface towards the sipe bottom, the sipe width gradually decreases from the tread surface to a first changing point and then gradually increases from the first changing point to the sipe bottom. At a second position, from the tread surface towards the sipe bottom, the sipe width gradually increases from the tread surface to a second changing point and then gradually decreases from the second changing point to the sipe bottom. The sipe width at the tread surface and at the sipe bottom gradually decreases in the tire circumferential direction from the first position towards the second position, and the sipe width in a tire radial intermediate portion gradually increases in the tire circumferential direction from the first position towards the second position.

19 Claims, 3 Drawing Sheets

(56) References Cited

U.S. PATENT DOCUMENTS

| | | | |
|---|---|---|---|
| 10,343,465 B2* | 7/2019 | Matsuyama | ........ B60C 11/1236 |
| 2008/0163970 A1 | 7/2008 | Ohara | |
| 2010/0218867 A1* | 9/2010 | Matsumoto | ............ B60C 11/12 |
| | | | 152/209.18 |
| 2012/0227883 A1 | 9/2012 | Audigier et al. | |
| 2014/0090761 A1 | 4/2014 | Foucher et al. | |
| 2017/0001478 A1 | 1/2017 | Rolland et al. | |
| 2019/0030958 A1 | 1/2019 | Caforio et al. | |
| 2020/0376895 A1* | 12/2020 | Hamanaka | .......... B60C 11/1281 |

FOREIGN PATENT DOCUMENTS

| | | |
|---|---|---|
| JP | 2003300403 A | 10/2003 |
| JP | 2006298057 A | 11/2006 |
| JP | 2007253875 A | 10/2007 |
| JP | 2013505874 A | 2/2013 |
| JP | 2014509980 A | 4/2014 |
| JP | 2014218095 A | 11/2014 |
| JP | 2016113003 A | 6/2016 |
| JP | 2017505261 A | 2/2017 |
| WO | 2014001069 A1 | 1/2014 |
| WO | 2018122713 A1 | 7/2018 |

OTHER PUBLICATIONS

Mar. 15, 2022, International Preliminary Report on Patentability issued in the International Patent Application No. PCT/JP2020/024397.

Jun. 23, 2023, Search result of the Extended European Search Report issued by the European Patent Office in the corresponding European Patent Application No. 20866430.0.

May 9, 2023, search result of Office Action issued by the China National Intellectual Property Administration in the corresponding Chinese Patent Application No. 202080059898.3.

\* cited by examiner

PNEUMATIC TIRE

TECHNICAL FIELD

The present disclosure relates to a pneumatic tire.

BACKGROUND

As technology for improving the drainage performance of a tire during progression of wear, it has been proposed to provide grooves or sipes, in the tread surface of the tire, whose groove width increases when wear progresses. For example, see Patent Literature (PTL) 1.

CITATION LIST

Patent Literature

PTL 1: JP 2013-505874 A

SUMMARY

Technical Problem

However, in pneumatic tires with grooves and sipes as described above, the appearance of widened portions as wear progresses may cause rapid changes in tire performance.

The present disclosure aims to provide a pneumatic tire capable of ensuring drainage performance when wear progresses while suppressing abrupt changes in tire performance when wear progresses.

Solution to Problem

A summary of the present disclosure is as follows.

(1) A pneumatic tire according to the present disclosure is a pneumatic tire including, on a tread surface, a plurality of circumferential main grooves extending in a tire circumferential direction, and a plurality of land portions defined between circumferential main grooves adjacent in a tire width direction among the plurality of circumferential main grooves or by the circumferential main grooves and tread edges, wherein the land portions include at least one circumferential sipe extending in the tire circumferential direction, at a first position of the circumferential sipe in the tire circumferential direction, from the tread surface towards a sipe bottom, a sipe width gradually decreases from the tread surface to a first changing point and then gradually increases from the first changing point to the sipe bottom, at a second position of the circumferential sipe in the tire circumferential direction, from the tread surface towards the sipe bottom, the sipe width gradually increases from the tread surface to a second changing point and then gradually decreases from the second changing point to the sipe bottom, and the sipe width at the tread surface and at the sipe bottom gradually decreases in the tire circumferential direction from the first position towards the second position, and the sipe width in an intermediate portion in a tire radial direction gradually increases in the tire circumferential direction from the first position towards the second position.

Here, the "tread surface" refers to the entire tread surface in the tread circumferential direction that comes into contact with the road surface when the pneumatic tire is mounted on an applicable rim, filled to a prescribed internal pressure, and subjected to the maximum load.

The "circumferential main groove" refers to a groove extending in the tread circumferential direction and having an opening width of 2 mm or more at the aforementioned tread surface when the pneumatic tire is mounted on an applicable rim, filled to a prescribed internal pressure, and under no load.

The "tread edges" refer to the outermost points of the aforementioned tread surface on both sides in the tire width direction.

The "circumferential sipe" refers to a sipe extending in the tread width direction and having an opening width of less than 2 mm at the aforementioned tread surface when the pneumatic tire is mounted on an applicable rim, filled to a prescribed internal pressure, and under no load.

In the present specification, the "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "rim" encompasses not only current sizes but also sizes that may be included in industrial standards in the future. An example of the "size that will be described in the future" is the size described under "future developments" in the ETRTO Standards Manual 2013). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "maximum load" refers to the load corresponding to the aforementioned maximum load capability.

Advantageous Effect

According to the present disclosure, a pneumatic tire capable of ensuring drainage performance when wear progresses while suppressing abrupt changes in tire performance when wear progresses can be provided.

DETAILED DESCRIPTION

Embodiments of the present disclosure are described below in detail with reference to the drawings.

The internal structure and the like of the pneumatic tire (hereinafter referred to simply as the tire) can be the same as those of conventional tires. As an example, the tire can have a pair of bead portions, a pair of sidewall portions connected to the pair of bead portions, and a tread portion disposed between the pair of sidewall portions. The tire can also have a carcass extending toroidally between the pair of bead portions and a belt disposed on the radially outward side of a crown portion of the carcass.

Unless otherwise specified, the dimensions and the like refer to the dimensions and the like when the tire is mounted on an applicable rim, filled to the prescribed internal pressure, and under no load.

Figure 1:
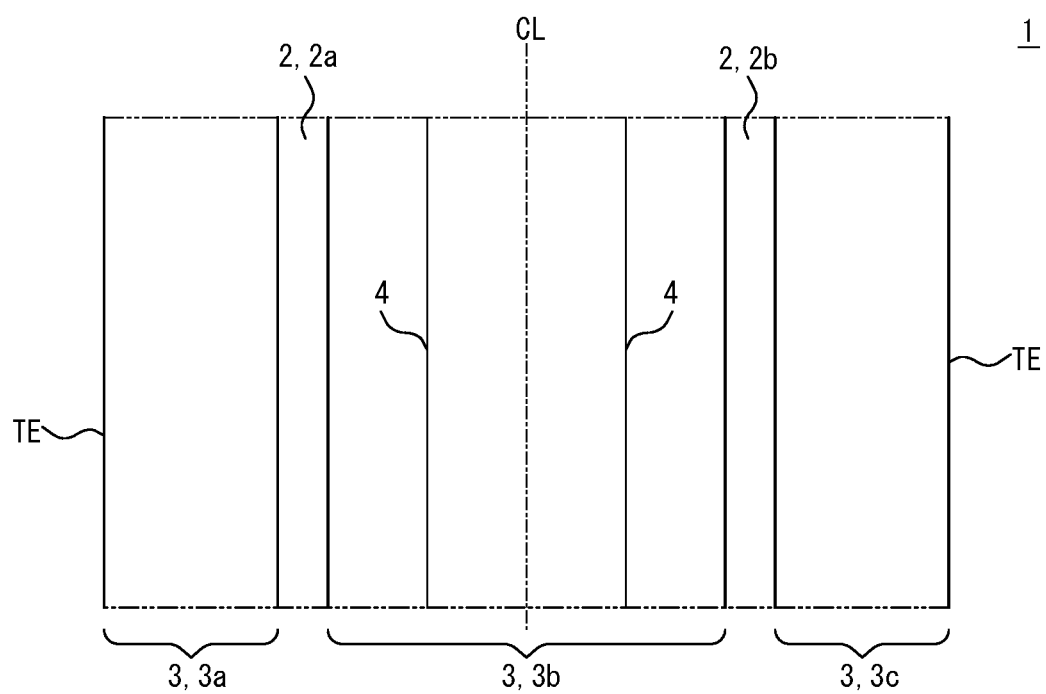
FIG. 1 is a developed view schematically illustrating a tread pattern of a pneumatic tire according to an embodiment of the present disclosure.

FIG. 1 is a developed view schematically illustrating a tread pattern of a pneumatic tire according to an embodiment of the present disclosure.

As illustrated in FIG. 1, a tire of the present example includes, on a tread surface 1, a plurality (two in the illustrated example) of circumferential main grooves 2 (2a, 2b) extending in the tire circumferential direction, and a plurality (three in the illustrated example) of land portions 3 (3a, 3b, 3c) defined between circumferential main grooves 2 adjacent in the tire width direction among the plurality of circumferential main grooves 2 or by the circumferential main grooves (2a, 2b) and the tread edges TE. In the present example, the circumferential main groove 2a is positioned in a half portion on one side, in the tire width direction, bordered by the tire equatorial plane CL, and the other circumferential main groove 2b is positioned in a half portion on the other side, in the tire width direction, bordered by the tire equatorial plane CL. In the present example, one land portion 3 (3b) is positioned on the tire equatorial plane CL, and one land portion 3 (3a, 3c) is positioned in each tire widthwise half. In the example illustrated in FIG. 1, the number of circumferential main grooves 2 is two, but the number can be one, or can be three or more. Accordingly, the number of land portions 3 can also be two, or can be four or more.

The land portion 3b includes at least one (two in the illustrated example) circumferential sipe 4 extending in the tire circumferential direction. In the present example, the land portion 3b includes the circumferential sipe 4, but it suffices for any land portion 3 to include the circumferential sipe 4. In the present example, all of the land portions 3 are rib-like land portions having no widthwise grooves (in the present specification, a land portion 3 divided in the tire circumferential direction by a widthwise sipe 4 is still considered to be a rib-like land portion as long as the land portion 3 is not completely divided by a widthwise groove). One or more land portions 3 can, however, be block-shaped land portions.

Here, the groove width (opening width (opening width measured perpendicular to the extending direction of the groove in plan view)) of the circumferential main groove 2 is not particularly limited, since the groove width also depends on the number of circumferential main grooves 2, but can, for example, be between 5 mm and 25 mm. Similarly, the groove depth (maximum depth) of the circumferential main groove 2 is not particularly limited, but can, for example, be between 6 mm and 18 mm.

In the illustrated example, the circumferential main grooves 2 all extend along the tire circumferential direction (without inclination) in plan view of the tread surface 1, but at least one of the circumferential main grooves 2 may extend at an inclination relative to the tire circumferential direction. In this case, the circumferential main groove 2 may be inclined at an angle of, for example, 5° or less relative to the tire circumferential direction. In the illustrated example, all of the circumferential main grooves 2 extend straight in the tire circumferential direction, but at least one of the circumferential main grooves 2 may have a shape such as a zigzag shape or a curved shape.

Here, the sipe width (opening width (opening width measured perpendicular to the extending direction of the groove in plan view)) of the circumferential sipe 4 is not particularly limited, since the sipe width also depends on the number of circumferential sipes 4, but can, for example, be between 0.2 mm and 1.0 mm (minimum value among changes in the circumferential direction). Similarly, the sipe depth (maximum depth) of the circumferential sipe 4 is not particularly limited, but can, for example, be between 4.0 mm and 18.0 mm.

In the illustrated example, all of the circumferential sipes 4 extend along the tire circumferential direction (without inclination), but one or more circumferential sipes 4 may extend at an inclination relative to the tire circumferential direction. In this case, the circumferential sipes 4 are preferably inclined relative to the tire circumferential direction at an inclination angle of 5° or less. The circumferential sipes 4 extend continuously along the circumference of the tire in the illustrated example but may include a discontinuous portion.

Figure 2:
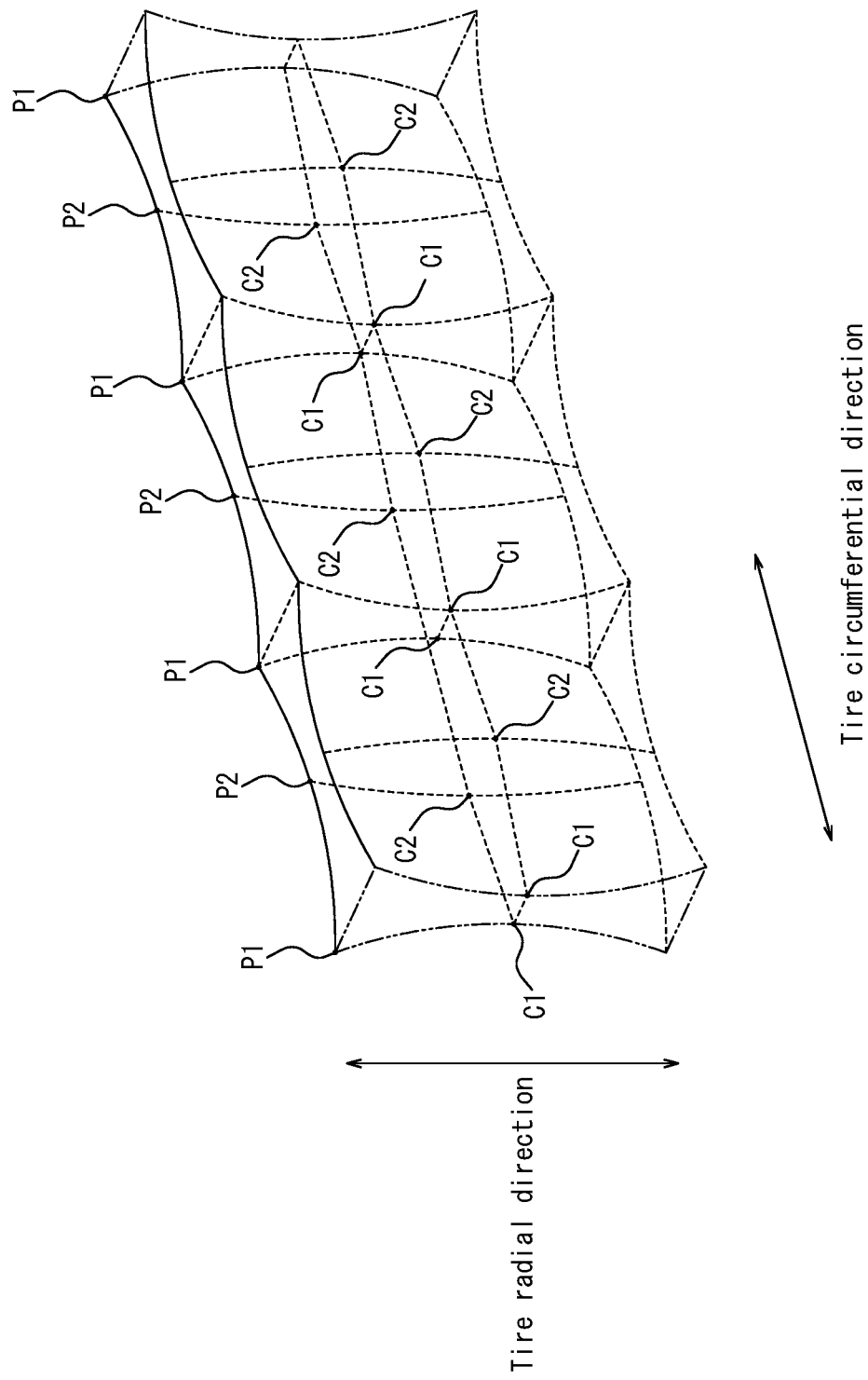
FIG. 2 is a partial perspective view of a circumferential sipe.
Figure 3A:
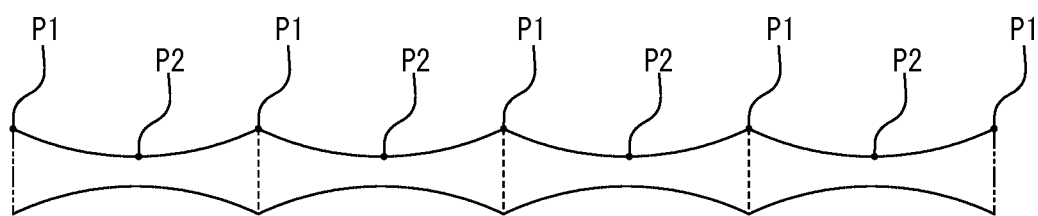
FIG. 3A is a plan view of the circumferential sipe at a tread surface and a sipe bottom.
Figure 3B:
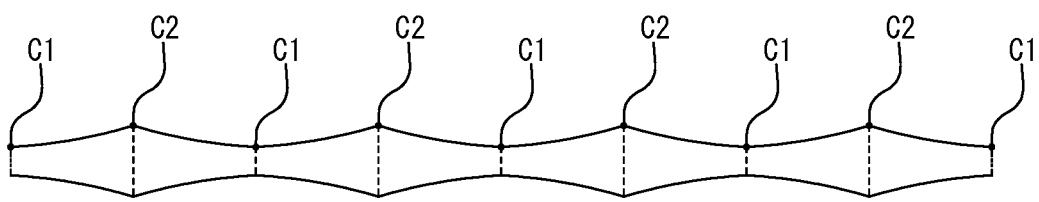
FIG. 3B is a plan view of the circumferential sipe at an intermediate portion in the tire radial direction.

FIG. 2 is a partial perspective view of a circumferential sipe. FIG. 3A is a plan view of the circumferential sipe at the tread surface and the sipe bottom. FIG. 3B is a plan view of the circumferential sipe at an intermediate portion in the tire radial direction.

As illustrated in FIG. 2, in the present embodiment, at a first position P1 of the circumferential sipe 4 in the tire circumferential direction, from the tread surface 1 (upper side of the drawing) towards the sipe bottom (lower side of the drawing), the sipe width gradually decreases from the tread surface 1 to a first changing point C1 and then gradually increases from the first changing point C1 to the sipe bottom. As illustrated in FIG. 2, at a second position P2 of the circumferential sipe in the tire circumferential direction, from the tread surface 1 towards the sipe bottom, the sipe width gradually increases from the tread surface 1 to a second changing point C2 and then gradually decreases from the second changing point C2 to the sipe bottom.

As illustrated in FIGS. 2 and 3A, the sipe width at the tread surface 1 and at the sipe bottom gradually decreases in the tire circumferential direction from the first position P1 towards the second position P2, and as illustrated in FIGS. 2 and 3B, the sipe width in the intermediate portion in the tire radial direction (the tire radial position of the changing points C1, C2 in the present example) gradually increases in the tire circumferential direction from the first position P1 towards the second position P2.

In the present example, the position of the first changing point C1 and the position of the second changing point C2 in the tire radial direction are identical, and the intermediate portion in the tire radial direction is at the position of the first changing point C1 and the second changing point C2 in the tire radial direction, as indicated above in parentheses. Here, the position of the first changing point C1 and the second changing point C2 is preferably in a range of 40% to 60% of the sipe depth and is at 50% of the sipe depth in the present example.

As illustrated in FIG. 2, the first position P1 and the second position P2 alternate at equal intervals in the tire circumferential direction, and the sipe shape of the circumferential sipe 4 from the first position P1 to the second position P2 is a shape that repeats in the tire circumferential direction while bending in the tire width direction.

In greater detail, the shape of the circumferential sipe 4 is such that at the first position P1, from the tread surface 1 towards the sipe bottom, the rate of change (rate of decrease) of the sipe width gradually decreases from the tread surface 1 to the first changing point C1, and the rate of change (rate of increase) of the sipe width gradually increases from the first changing point C1 to the sipe bottom, as illustrated in FIG. 2. In a tread widthwise cross-sectional view, the sipe wall (on both sides) at the first position P1 forms an arc having a center of curvature on the land portion 3 side.

As illustrated in FIG. 2, at the second position P2, from the tread surface 1 towards the sipe bottom, the rate of change (rate of increase) of the sipe width gradually decreases from the tread surface 1 to the second changing point C2, and the rate of change (rate of decrease) of the sipe width gradually increases from the second changing point C2 to the sipe bottom. In a tread widthwise cross-sectional view, the sipe wall (on both sides) at the second position P2 forms an arc having a center of curvature on the circumferential sipe 4 side.

As illustrated in FIGS. 2 and 3A, at the tread surface 1, the rate of change (rate of decrease) of the sipe width gradually decreases in the tire circumferential direction from the first position P1 to the second position P2. As illustrated in FIGS. 2 and 3A, at the sipe bottom, the rate of change (rate of decrease) of the sipe width gradually decreases in the tire circumferential direction from the first position P1 to the second position P2.

On the other hand, as illustrated in FIGS. 2 and 3B, at the intermediate portion in the tire radial direction (the position of the changing points C1, C2 in the radial direction in the present example), the rate of change (rate of increase) of the sipe width gradually increases in the tire circumferential direction from the first position P1 to the second position P2.

The effects of the pneumatic tire according to the present embodiment are described below.

According to the pneumatic tire of the present embodiment, first, the drainage performance can be improved, since one or more circumferential sipes 4 are provided in the land portions 3.

At the second position P2, the sipe width of the circumferential sipe 4 gradually increases from the tread surface 1 to the second changing point C2, thereby ensuring the drainage performance when wear progresses up to the first changing point C1. Conversely, at the first position P1, the sipe width gradually decreases from the tread surface 1 to the first changing point C1, thereby increasing the sipe rigidity and reducing the rolling resistance.

At the first position P1, the sipe width of the circumferential sipe 4 gradually increases from the first changing point C1 to the sipe bottom, thereby ensuring the drainage performance when wear progresses from the first changing point C1 onward. Conversely, at the second position P2, the sipe width gradually decreases from the second changing point C2 to the sipe bottom, thereby increasing the sipe rigidity and reducing the rolling resistance.

Furthermore, the sipe width at the tread surface 1 and at the sipe bottom gradually decreases in the tire circumferential direction from the first position P1 towards the second position P2, and the sipe width in the intermediate portion in the tire radial direction gradually increases in the tire circumferential direction from the first position P1 towards the second position P2. Therefore, at the first position P1, where the sipe width is larger at the tread surface 1, the sipe width gradually decreases at the time of wear from the tread surface 1 up to the first changing point C1, and at the second position P2, where the sipe width is smaller at the tread surface 1, the sipe width gradually increases at the time of wear from the tread surface 1 up to the second changing point C2. Furthermore, at the first position P1, where the sipe width is smaller in the intermediate portion in the tire radial direction, the sipe width gradually increases at the time of wear from the first changing point C1 to the sipe bottom, and at the second position P2, where the sipe width is larger in the intermediate portion in the tire radial direction, the sipe width gradually decreases at the time of wear from the second changing point C2 to the sipe bottom. Consequently, the circumferential sipe 4 as a whole is configured so that the average sipe width does not change significantly when wear progresses.

Also, since the aforementioned changes in sipe width are all gradual increases or decreases, the change in sipe width at any circumferential position when wear progresses is continuous, and the change in sipe width in the tire circumferential direction is also continuous at any depth position. Accordingly, when wear progresses, the position in the tire circumferential direction where the width increases does not suddenly change, nor does the sipe volume suddenly change, thereby suppressing a sudden change in tire performance (such as wear resistance).

As described above, the pneumatic tire of the present embodiment is capable of ensuring drainage performance when wear progresses while suppressing abrupt changes in tire performance when wear progresses.

As in the present embodiment, at the first position, from the tread surface towards the sipe bottom, the rate of change of the sipe width preferably gradually decreases from the tread surface to the first changing point and gradually increases from the first changing point to the sipe bottom, and at the second position, from the tread surface towards the sipe bottom, the rate of change of the sipe width preferably gradually decreases from the tread surface to the second changing point and gradually increases from the second changing point to the sipe bottom.

The sipe wall thus has a smooth shape in the tire radial direction, which is advantageous in terms of manufacturing, such as ease of mold removal, and also because inflection points do not form on the sipe wall in the tire radial direction, thereby suppressing failure such as the occurrence of cracks.

As in the present embodiment, at the tread surface, the rate of change of the sipe width preferably gradually decreases in the tire circumferential direction from the first position to the second position, and at the sipe bottom, the rate of change of the sipe width preferably gradually decreases in the tire circumferential direction from the first position to the second position.

The sipe wall thus has a smooth shape in the tire circumferential direction, which is advantageous in terms of manufacturing, such as ease of mold removal, and also because inflection points do not form on the sipe wall in the tire circumferential direction, thereby suppressing failure such as the occurrence of cracks.

As in the present embodiment, at the intermediate portion in the tire radial direction, the rate of change of the sipe width preferably gradually increases in the tire circumferential direction from the first position to the second position.

A longer section with a short distance between the sipe walls can thus be secured in the tire circumferential direction, thereby further increasing the sipe rigidity and further reducing the rolling resistance.

As in the present embodiment, the position of the first changing point and the position of the second changing point in the tire radial direction are preferably identical, and the intermediate portion in the tire radial direction is preferably at the position of the first changing point and the second changing point in the tire radial direction. The shape of the circumferential sipe is thus kept simple, which is advantageous in terms of manufacturing.

The position of the first changing point and the second changing point is preferably in a range of 40% to 60% of the sipe depth and is more preferably at 50% of the sipe depth. Ensuring both the tire radial length from the tread surface to the first changing point and the second changing point and the tire radial length from the first changing point and the second changing point to the sipe bottom in this way is advantageous for causing the sipe width to change as smoothly as possible when wear progresses.

The circumferential sipe preferably has a shape that repeats in the tire circumferential direction while bending in the tire width direction. This can achieve the above-described effects along the entire tire circumferential direction.

The above-described circumferential sipe is not particularly limited but can be formed using a 3D printer, for example.

The circumferential sipe of the present disclosure may be applied to any of the circumferential sipes but is preferably applied at least to all of the circumferential sipes within the center land portion (the land portion on the tire equatorial plane CL as illustrated in FIG. 1, or in the case of a circumferential main groove 2 being located on the tire equatorial plane CL, the land portions adjacent to that circumferential main groove 2).

In the above embodiment, the sipe width at the tread surface 1 and the sipe width at the sipe bottom are the same at each first position P1 and each second position P2, but the sipe width at the tread surface 1 and the sipe width at the sipe bottom may differ among the first positions P1 and/or the second positions P2. In this case, the sipe width at the sipe bottom is preferably greater than the sipe width at the tread surface in consideration of the decrease in the groove volume when wear progresses.

Accordingly, in the above embodiment, at each first position P1 and each second position P2, the rate of change of the sipe width from the tread surface 1 to the first changing point C1 and the second changing point C2 and the rate of change of the sipe width from the first changing point C1 and the second changing point C2 to the sipe bottom (for example, when the rate of change is defined uniformly as the larger value/the smaller value) are equivalent, but the rate of change of the sipe width from the tread surface 1 to the first changing point C1 and/or the second changing point C2 and the rate of change of the sipe width from the first changing point C1 and/or the second changing point C2 to the sipe bottom may differ among the first positions P1 and/or the second positions P2. In this case, the rate of increase (rate of decrease) of the sipe width from the first changing point C1 and/or the second changing point C2 to the sipe bottom and the rate of increase (rate of decrease) of the sipe width from the tread surface 1 to the first changing point C1 and/or the second changing point C2 is preferably large in the case of a rate of increase and small in the case of a rate of decrease, in consideration of the decrease in the groove volume when wear progresses.

REFERENCE SIGNS LIST

1 Tread surface
2, 2a, 2b Circumferential main groove
3, 3a, 3b, 3c Land portion
4 Circumferential sipe
CL Tire equatorial plane
TE Tread edge

The invention claimed is:

1. A pneumatic tire comprising, on a tread surface, a plurality of circumferential main grooves extending in a tire circumferential direction, and a plurality of land portions defined between circumferential main grooves adjacent in a tire width direction among the plurality of circumferential main grooves or by the circumferential main grooves and tread edges, wherein
   the land portions include at least one circumferential sipe extending in the tire circumferential direction,
   at a first position of the circumferential sipe in the tire circumferential direction, from the tread surface towards a sipe bottom, a sipe width gradually decreases from the tread surface to a first changing point and then gradually increases from the first changing point to the sipe bottom,
   at a second position of the circumferential sipe in the tire circumferential direction, from the tread surface towards the sipe bottom, the sipe width gradually increases from the tread surface to a second changing point and then gradually decreases from the second changing point to the sipe bottom, and
   the sipe width at the tread surface and at the sipe bottom gradually decreases in the tire circumferential direction from the first position towards the second position, and the sipe width in an intermediate portion in a tire radial direction gradually increases in the tire circumferential direction from the first position towards the second position.

2. The pneumatic tire of claim 1, wherein
   at the first position, from the tread surface towards the sipe bottom, a rate of change of the sipe width gradually decreases from the tread surface to the first changing point and gradually increases from the first changing point to the sipe bottom, and
   at the second position, from the tread surface towards the sipe bottom, a rate of change of the sipe width gradually decreases from the tread surface to the second changing point and gradually increases from the second changing point to the sipe bottom.

3. The pneumatic tire of claim 2, wherein
   at the tread surface, a rate of change of the sipe width gradually decreases in the tire circumferential direction from the first position to the second position, and
   at the sipe bottom, a rate of change of the sipe width gradually decreases in the tire circumferential direction from the first position to the second position.

4. The pneumatic tire of claim 3, wherein at the intermediate portion in the tire radial direction, a rate of change of the sipe width gradually increases in the tire circumferential direction from the first position to the second position.

5. The pneumatic tire of claim 2, wherein at the intermediate portion in the tire radial direction, a rate of change of the sipe width gradually increases in the tire circumferential direction from the first position to the second position.

6. The pneumatic tire of claim 2, wherein
   a position of the first changing point and a position of the second changing point in the tire radial direction are identical, and the intermediate portion in the tire radial direction is at the position of the first changing point and the second changing point in the tire radial direction.

7. The pneumatic tire of claim 2, wherein a sipe shape of the circumferential sipe from the first position to the second position is a shape that repeats in the tire circumferential direction while bending in the tire width direction.

8. The pneumatic tire of claim 1, wherein
at the tread surface, a rate of change of the sipe width gradually decreases in the tire circumferential direction from the first position to the second position, and
at the sipe bottom, a rate of change of the sipe width gradually decreases in the tire circumferential direction from the first position to the second position.

9. The pneumatic tire of claim 8, wherein at the intermediate portion in the tire radial direction, a rate of change of the sipe width gradually increases in the tire circumferential direction from the first position to the second position.

10. The pneumatic tire of claim 8, wherein
a position of the first changing point and a position of the second changing point in the tire radial direction are identical, and
the intermediate portion in the tire radial direction is at the position of the first changing point and the second changing point in the tire radial direction.

11. The pneumatic tire of claim 8, wherein a sipe shape of the circumferential sipe from the first position to the second position is a shape that repeats in the tire circumferential direction while bending in the tire width direction.

12. The pneumatic tire of claim 1, wherein at the intermediate portion in the tire radial direction, a rate of change of the sipe width gradually increases in the tire circumferential direction from the first position to the second position.

13. The pneumatic tire of claim 12, wherein
a position of the first changing point and a position of the second changing point in the tire radial direction are identical, and
the intermediate portion in the tire radial direction is at the position of the first changing point and the second changing point in the tire radial direction.

14. The pneumatic tire of claim 12, wherein a sipe shape of the circumferential sipe from the first position to the second position is a shape that repeats in the tire circumferential direction while bending in the tire width direction.

15. The pneumatic tire of claim 1, wherein
a position of the first changing point and a position of the second changing point in the tire radial direction are identical, and
the intermediate portion in the tire radial direction is at the position of the first changing point and the second changing point in the tire radial direction.

16. The pneumatic tire of claim 15, wherein the position of the first changing point and the second changing point is in a range of 40% to 60% of a sipe depth.

17. The pneumatic tire of claim 16, wherein a sipe shape of the circumferential sipe from the first position to the second position is a shape that repeats in the tire circumferential direction while bending in the tire width direction.

18. The pneumatic tire of claim 15, wherein a sipe shape of the circumferential sipe from the first position to the second position is a shape that repeats in the tire circumferential direction while bending in the tire width direction.

19. The pneumatic tire of claim 1, wherein a sipe shape of the circumferential sipe from the first position to the second position is a shape that repeats in the tire circumferential direction while bending in the tire width direction.

\* \* \* \* \*